Dec. 23, 1941.  J. ANDREWS  2,266,725

FISHHOOK

Filed March 12, 1941

Inventor

John Andrews

By  Clarence A. O'Brien

Attorney

Patented Dec. 23, 1941

2,266,725

UNITED STATES PATENT OFFICE 2,266,725

FISHHOOK

John Andrews, Superior, Wis.

Application March 12, 1941, Serial No. 382,987

1 Claim. (Cl. 43—40)

The present invention relates to new and useful improvements in fishhooks and has for its primary object to provide a device of this character comprising novel means for securing a minnow or other live bait in a manner to prevent it from being stolen by the fish.

Another very important object of the invention is to provide a hook of the aforementioned character which is adapted to hold the minnow or other live bait in a natural position in the water, thereby attracting and luring the fish thereto.

Other objects of the invention are to provide a fish hook of the character described which will be comparatively simple in construction, strong, durable, highly efficient and reliable in use and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein.

Figure 1:
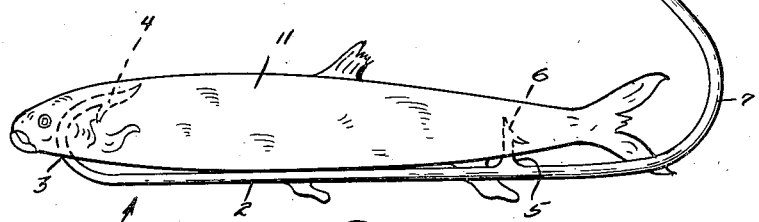
Figure 1 is a view in side elevation of a fish hook constructed in accordance with the present invention, showing a minnow in position thereon.
Figure 2:
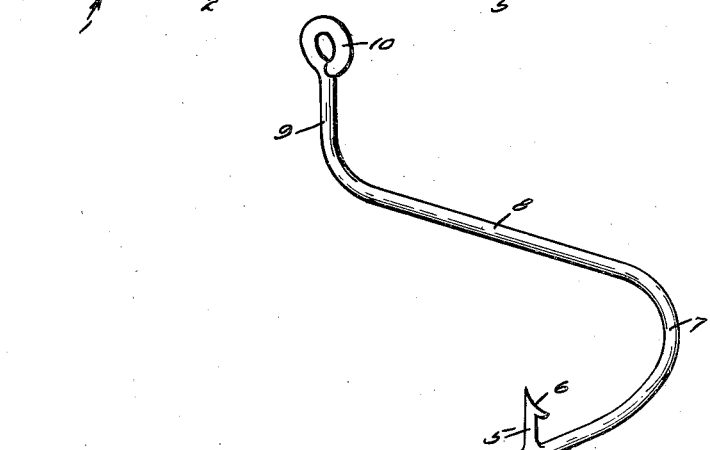
Figure 2 is a perspective view of the fish hook.

Referring now to the drawing in detail, it will be seen that the embodiment of the invention which has been illustrated comprises a hook which is designated generally by the reference numeral 1. The hook 1 includes a shank 2 of suitable metal, which shank may be of any desired length. At one end, the shank 2 merges into an upwardly and rearwardly curved bill 3 which terminates in a barb 4. Rising from the other end portion of the shank 2 is a stem 5 which is formed to provide a barb 6 on its upper end.

The rear end portion of the horizontal shank 2 is curved upwardly and forwardly, as at 7, and merges into an inclined arm 8 which extends forwardly above the shank 2. The inclined arm 8 is provided with a substantially vertical upper end portion 9 which terminates in an eye 10 for connection with a line (not shown).

In Figure 1 of the drawing, a minnow is indicated at 11. It is thought that the manner in which the device functions will be readily apparent from a consideration of the foregoing. As illustrated, the minnow 11 is impaled on the bill 3 and the stem 5 of the hook 1, said bill 3 being inserted in the head portion of said minnow, the stem 5 with the barb 6 thereon being inserted in the tail portion thereof. Thus, the minnow is firmly secured and supported in a substantially horizontal, natural position above the shank 2 of the hook 1. This substantially horizontal position is maintained by reason of the fact that the line is connected to the device in a vertical plane above an intermediate portion of the shank 2.

It is believed that the many advantages of a fish hook constructed in accordance with the present invention will be readily understood and although a preferred embodiment of the device is as illustrated and described, it is to be understood that changes in the details of construction may be resorted to which will fall within the scope of the invention as claimed.

What is claimed is:

A fishhook comprising a relatively straight elongated horizontal shank provided at one end with a return bend constituting a bill, and having said return bend terminating in an integral barb; said shank at a point slightly spaced inwardly from the end thereof remote from said return bend having a relatively short shank projecting laterally therefrom substantially in the plane of said reverse bend and terminating in a barb cooperable with the first named barb for impaling a minnow on the shank in a position substantially parallel with the shank; and said shank at the last named end thereof merging into a reverse bend that in turn merges into a relatively straight inclined arm disposed in a plane normal to the shank, merging into a terminal extremity extending in a direction away from the shank and substantially at right angles to the shank, and terminating in an eye for accommodating a fish line.

JOHN ANDREWS.